(12) United States Patent
Sun

(10) Patent No.: US 10,761,416 B2
(45) Date of Patent: Sep. 1, 2020

(54) PET-FILM-BONDED TYPE TRANSPARENT ANTI-UV PROJECTION SCREEN AND PRODUCTION METHOD THEREFOR

(71) Applicant: SHANGHAI LANMOU MEDIA TECHNOLOGY Co., Ltd., Hongkou District, Shanghai (CN)

(72) Inventor: Xugang Sun, Shanghai (CN)

(73) Assignee: SHANGHAI LANMOU MEDIA TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/342,442

(22) PCT Filed: Sep. 21, 2017

(86) PCT No.: PCT/CN2017/102595
§ 371 (c)(1),
(2) Date: Apr. 16, 2019

(87) PCT Pub. No.: WO2018/072590
PCT Pub. Date: Apr. 26, 2018

(65) Prior Publication Data
US 2020/0057360 A1    Feb. 20, 2020

(30) Foreign Application Priority Data

Oct. 18, 2016 (CN) .......................... 2016 1 0908779

(51) Int. Cl.
*B32B 7/02* (2019.01)
*G03B 21/62* (2014.01)
*G02B 30/26* (2020.01)
*C08J 5/18* (2006.01)

(52) U.S. Cl.
CPC ................ *G03B 21/62* (2013.01); *C08J 5/18* (2013.01); *G02B 30/26* (2020.01); *C08J 2367/02* (2013.01)

(58) Field of Classification Search
CPC ......... C08J 2367/02; C08J 5/18; G02B 30/26; G03B 21/60; G03B 21/62; B32B 7/02
See application file for complete search history.

(56) References Cited

FOREIGN PATENT DOCUMENTS

| CN | 101266398 A | 9/2008 |
|---|---|---|
| CN | 101323191 A | 12/2008 |
| CN | 101441396 A | 5/2009 |
| CN | 103472667 A | 12/2013 |
| CN | 103709689 A | 4/2014 |
| CN | 106647137 A | 5/2017 |

*Primary Examiner* — Lawrence D Ferguson
(74) *Attorney, Agent, or Firm* — Craft Chu PLLC; Andrew W. Chu

(57) ABSTRACT

The PET-film-bonded type transparent anti-UV projection screen includes a PET film layer, an adhesive layer and a transparent supporting layer which are sequentially stacked from top to bottom. The PET film layer is prepared by uniformly mixing PET resin, an antioxidant, a light stabilizer and a nanoparticle dispersion in a molten state, pre-crystallizing and drying the mixture, and then extruding, stretching and molding the mixture. The production method for the PET-film-bonded type transparent anti-UV projection screen includes preparing a nanoparticle dispersion; preparing a PET film; and performing coating and bonding the film.

4 Claims, 1 Drawing Sheet

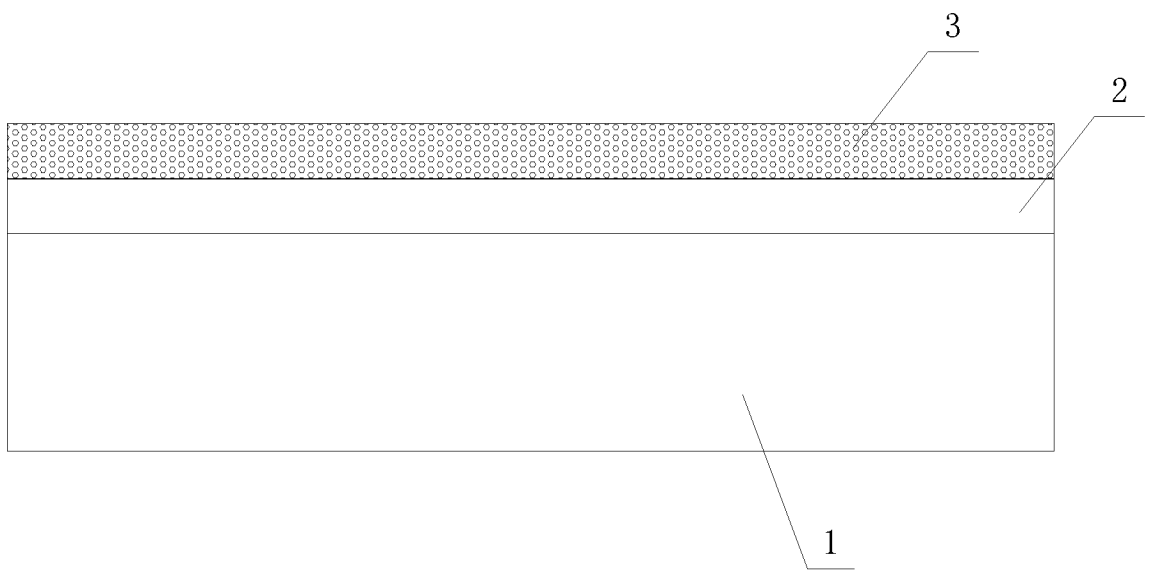

PET-FILM-BONDED TYPE TRANSPARENT ANTI-UV PROJECTION SCREEN AND PRODUCTION METHOD THEREFOR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of projection screen production, in particular to a transparent anti-UV projection screen and a production method therefor.

2. Description of Related Art Including Information Disclosed Under 37 CFR 1.97 and 37 CFR 1.98

At present, overhead projectors and slide projectors are widely used as tools for presenters to display materials in meetings and the like, and video projectors and movie projectors using liquid crystals are also widely used in normal households. The projection method of these projectors includes: modulating light output from a light source with a projection type liquid crystal panel and the like to form image light, emitting the image light through an optical system such as a lens, and thus projecting the image and the like onto a screen. When the short-wave light emitted by the projector is close to the wavelength of the ultraviolet light, that is, 10 to 400 nm (nanometer), the ultraviolet light will be diffusely reflected onto the human body, and thus is harmful to the human body.

The base color of the traditional projection screen is mostly white, and the stereoscopic effect of the 3D image reflected into the human eyes is achieved by integrating the misplaced projection image with 3D glasses. However, the wearing of the glasses is inconvenient, the imaging definition is low, the color of the signal itself cannot be truly reproduced, and the contrast and depth of field of the image are not enough. Consequently, the traditional projection screen cannot reach the standards of advertising, media and other practical industries.

BRIEF SUMMARY OF THE INVENTION

The technical problem to be solved by the present invention is to provide a PET-film-bonded type transparent anti-UV projection screen which is simpler to manufacture, low in cost, high in production efficiency, higher in transparency and definition, and capable of directly displaying 3D images, and a production method therefor.

The technical solution of the present invention to solve the above technical problem is as follows.

A PET-film-bonded type transparent anti-UV projection screen comprises a PET film layer, an adhesive layer and a transparent supporting layer which are sequentially stacked from top to bottom, wherein the PET film layer is prepared by uniformly mixing PET resin, an antioxidant, a light stabilizer and a nanoparticle dispersion in a molten state, pre-crystallizing and drying the mixture, and then extruding, stretching and molding the mixture, the nanoparticle dispersion is prepared by uniformly mixing nanoparticles, a dispersant and a solvent, and then dispersing the mixture with ultrasonic waves, and the distribution density of the nanoparticles in the PET film layer is 0.008 to 1.6 g/mm·m2.

Compared with the prior art, the beneficial effects of the product of the present invention are as follows.

The product of the present invention is simpler to manufacture, higher in production efficiency, lower in cost, and higher in transparency and definition, has a more remarkable transparent imaging effect, can directly display 2.5D or 3D images by nanoparticle Rayleigh scattering imaging, and is more convenient to use since an observer can see the 2.5D or 3D image projected onto the projection screen at any position in front of the product without 3D glasses. In addition, the nanoparticles can absorb ultraviolet rays in the case of light transmission, thereby effectively avoiding the damage caused by the diffuse reflection of ultraviolet rays to the human body. The PET-film-bonded type transparent anti-UV projection screen can be widely used in the fields of indoor advertising, architectural glass, GPS display of vehicle windows and the like.

The present invention can be improved as follows based on the above technical solution.

As a preferred embodiment of the present invention, the nanoparticles are composed of titanium dioxide nanoparticles and inorganic salt nanoparticles with a mass ratio of (1-81):9, the titanium dioxide nanoparticles have a diameter of 20 to 100 nm, and the inorganic salt nanoparticles have a diameter of 100 to 300 nm.

The beneficial effects of using the above preferred solution are as follows.

By using the titanium dioxide nanoparticles having the specific particle diameter and inorganic salt nanoparticles having the specific particle diameter, with the specific mass ratio in a combined manner, the Rayleigh scattering imaging effects of the nanoparticles are better, the ultraviolet light can be more efficiently absorbed, harmful substances in the room can be decomposed by the photocatalytic action, the formaldehyde, benzene and other harmful gases in the room can be purified, and thus high safety during use is achieved.

As another preferred embodiment of the present invention, the titanium dioxide nanoparticles are of an anatase crystal structure and/or a rutile crystal structure, and the inorganic salt nanoparticles are one or more of nanoparticles of barium sulfate, barium carbonate and calcium carbonate.

The beneficial effects of using the above preferred solution are that: by using the titanium dioxide nanoparticles with a specific structure and a specific type of inorganic salt nanoparticles, the Rayleigh scattering imaging effects of nanoparticles are better, the ultraviolet light can be more efficiently absorbed, harmful substances in the room can be decomposed by the photocatalytic action, the formaldehyde, benzene and other harmful gases in the room can be purified, and thus high safety during use is achieved.

As another preferred embodiment of the present invention, the transparent supporting layer is a transparent glass plate, a transparent acrylic hardened plate or a transparent polycarbonate plate, and the adhesive layer is formed by uniformly stirring ethyl acrylate, rosin resin and ethylene glycol with a mass ratio of (2.5-3.5):1:(2.5-3.5) at 50° C.-60° C. and performing uniform coating.

The beneficial effects of using the above preferred solution are that: by using such a transparent supporting layer and an adhesive layer, the product is simpler to manufacture, high in production efficiency, low in cost, and high in transparency and definition. In addition, the supporting and protecting action of the transparent supporting layer is more remarkable. High simplicity, convenience and reliability are achieved without affecting the transparent imaging effect of the product by bonding the PET film layer and the transparent supporting layer by the adhesive layer (which is clear and transparent, and has high adhesiveness).

As another preferred embodiment of the present invention, the transparent supporting layer has a thickness of 0.1 to 20 mm, and the PET film layer has a thickness of 0.05 to 5 mm.

The beneficial effects of using the above preferred solution are that: it can ensure that the supporting action of the transparent supporting layer for the projection screen, and can also effectively ensure the higher transparency and definition of the product. The transparent imaging effect is more remarkable. The product has excellent toughness, heat resistance, cold resistance, and dimensional stability and thus has a wider application range.

A production method for the above PET-film-bonded type transparent anti-UV projection screen comprises the steps of:

A. Preparing a Nanoparticle Dispersion mixing 0.001 to 0.2 part by weight of nanoparticles, 0.001 to 0.004 part by weight of a dispersant, and 16 to 30 parts by weight of a solvent uniformly, dispersing the mixture by ultrasonic waves with a frequency of 20 to 2000 kHz for 20 to 600 minutes to make the nanoparticles uniformly dispersed in the solvent and thus obtaining a uniform and stable nanoparticle dispersion;

B. Preparing a PET Film stirring and mixing 100 parts by weight of PET resin, 0.1 to 5 parts by weight of an antioxidant, 0.1 to 5 parts by weight of a light stabilizer and the nanoparticle dispersion prepared in step A in a molten state uniformly, pre-crystallizing and drying the mixture, and then extruding, stretching and molding the mixture to obtain a PET film layer having a nanoparticle distribution density of 0.008 to 1.6 g/mm·m2; and C. Performing Coating and Bonding the Film taking a clean transparent supporting layer, uniformly stirring ethyl acrylate, rosin resin and ethylene glycol with a mass ratio of (2.5-3.5):1:(2.5-3.5) at 50° C. to 60° C., and then uniformly coating the upper surface of the transparent supporting layer or the lower surface of the PET film layer in step B with the mixture to form an adhesive layer, and then bonding the PET film layer and the transparent supporting layer together by the adhesive layer, thereby obtaining the PET-film-bonded type transparent anti-UV projection screen.

Compared with the prior art, the beneficial effects of the method of the present invention are as follows.

The production process of the present invention is simpler, the higher production efficiency and lower cost are achieved, and the obtained product has higher transparency and definition, and a more remarkable transparent imaging effect, can directly display 2.5D or 3D images by nanoparticle Rayleigh scattering imaging, and is more convenient to use since an observer can see the 2.5D or 3D image projected onto the projection screen at any position in front of the product without 3D glasses. In addition, the nanoparticles in the product can absorb ultraviolet rays in the case of light transmission, thereby effectively avoiding damage caused by the diffuse reflection of ultraviolet rays to the human body.

As another preferred embodiment of the present invention, in step A, the dispersant is a polyphosphoric acid-based hyperdispersant, a poly silicic acid-based hyperdispersant, a polycarboxylic acid-based hyperdispersant, a polyester-based hyperdispersant or a polyether-based hyperdispersant, and the solvent is methanol, ethanol or acetone.

The beneficial effects of using the above preferred solution are that: the nanoparticles may be more uniformly dispersed in the solvent, so as to obtain the uniform and stable nanoparticle dispersion more simply and quickly.

As another preferred embodiment of the present invention, in step A, the dispersant is a commercially available hyperdispersant 9800.

The beneficial effects of using the above preferred solution are that: the nanoparticles may be more uniformly dispersed in the solvent, so as to obtain the uniform and stable nanoparticle dispersion more simply and quickly.

As another preferred embodiment of the present invention, in step B, feeding PET resin, the antioxidant, the light stabilizer and the nanoparticle dispersion prepared in step A into a high-speed mixer, stirring and mixing the same in a molten state uniformly, pre-crystallizing and drying the mixture, then feeding the mixture into a screw extruder, and extruding the mixture via a die to obtain a sheet, and then, biaxially stretching the sheet simultaneously to obtain a PET film layer.

The beneficial effects of using the above preferred solution are that: the nanoparticle dispersion can be uniformly mixed with the PET resin more simply, conveniently, quickly and efficiently, and then the mixture is extruded, stretched and molded into the PET film layer.

As another preferred embodiment of the present invention, in step B, the antioxidant is one or more of pentaerythritol tetrakis[β-(3,5-di-tert-butyl-4-hydroxyphenyl) propionate, octadecyl β-(3,5-di-tert-butyl-4-hydroxyphenyl) propionate, tris (2,4-di-t-butylphenyl) phosphite, and bi(octadecyl) thiodipropionate, and the light stabilizer is one or more of 2-hydroxy-4-n-octyloxybenzophenone, bis(2,2, 6,6-tetramethyl-4-piperidinyl) sebacate, bis(1,2,2,6,6-pentamethyl-4-piperidyl) sebacate and poly (1-hydroxyethyl-2, 2,6,6-tetramethyl-4-hydroxypiperidine) succinate.

The beneficial effects of using the above preferred solution are that: the nanoparticle dispersion can be uniformly mixed with the PET resin more simply, quickly and efficiently, and thus the extruding, stretching and molding of the PET film layer are more convenient.

The best embodiment of the present invention will be further described in detail below.

A PET-film-bonded type transparent anti-UV projection screen comprises a PET film layer, an adhesive layer and a transparent supporting layer which are sequentially stacked from top to bottom. The transparent supporting layer may be a transparent glass plate, a transparent acrylic hardened plate or a transparent polycarbonate plate, or the like. The transparent supporting layer has a thickness of 0.1 to 20 mm and plays a supporting and protection action. The adhesive layer is formed by uniformly stirring ethyl acrylate, rosin resin and ethylene glycol with a mass ratio of (2.5-3.5):1:(2.5-3.5) at 50° C. to 60° C. and performing uniform coating.

The PET film layer is prepared by uniformly mixing PET resin (i.e., polyethylene terephthalate), an antioxidant, a light stabilizer and a nanoparticle dispersion in a molten state, pre-crystallizing and drying the mixture, and then extruding, stretching and molding the mixture. The nanoparticle dispersion is prepared by uniformly mixing nanoparticles, a dispersant and a solvent, and then dispersing the mixture with ultrasonic waves. The nanoparticles are composed of titanium dioxide nanoparticles and inorganic salt nanoparticles with a mass ratio of (1-81):9. The titanium dioxide nanoparticles are nanoparticles adopting an anatase crystal structure and/or a rutile crystal structure and having a diameter of 20 to 100 nm, and the inorganic salt nanoparticles are one or more of nanoparticles of barium sulfate, barium carbonate and calcium carbonate having a diameter of 100 to 300 nm. The distribution density of the nanoparticles in the PET film layer is 0.008 to 1.6 g/mm·m2, that is, 0.008 to 1.6 g of nanoparticles are uniformly distributed in a transparent imaging film interlayer with a thickness of 1 mm and an area of 1 m2, and the thickness of the PET film layer is set as 0.05 to 5 mm.

A production method for the above PET-film-bonded type transparent anti-UV projection screen comprising the steps of:

A. Preparing a Nanoparticle Dispersion mixing 0.001 to 0.2 part by weight of nanoparticles, 0.001 to 0.004 part by weight of a dispersant, and 16 to 30 parts by weight of a solvent uniformly, dispersing the mixture by ultrasonic waves with a frequency of 20 to 2000 kHz for 20 to 600 minutes to make the nanoparticles uniformly dispersed in the solvent and thus obtaining a uniform and stable nanoparticle dispersion, wherein the dispersant is a polyphosphoric acid-based hyperdispersant, a poly silicic acid-based hyperdispersant, a polycarboxylic acid-based hyperdispersant, a polyester-based hyperdispersant or a polyether-based hyperdispersant, most preferably a commercially available hyperdispersant 9800, and the solvent is methanol, ethanol or acetone;

B. Preparing a PET Film feeding 100 parts by weight of PET resin, 0.1 to 5 parts by weight of an antioxidant, 0.1 to 5 parts by weight of a light stabilizer and the nanoparticle dispersion prepared in step A into a high-speed mixer and stirring and mixing the same in a molten state uniformly, then feeding the mixture into a screw extruder, and extruding the mixture via a die to obtain a sheet, and then, biaxially stretching the sheet simultaneously to obtain a PET film layer having a nanoparticle distribution density of 0.008 to 1.6 g/mm·m2, wherein the antioxidant is one or more of pentaerythritol tetrakis [β-(3,5-di-tert-butyl-4-hydroxyphenyl) propionate, octadecyl β-(3,5-di-tert-butyl-4-hydroxyphenyl)propionate, tris (2,4-di-t-butylphenyl) phosphite, and bi(octadecyl) thiodipropionate, and the light stabilizer is one or more of 2-hydroxy-4-n-octyloxybenzophenone, bis(2,2,6,6-tetramethyl-4-piperidinyl) sebacate, bis(1,2,2,6,6-pentamethyl-4-piperidyl) sebacate and poly (1-hydroxyethyl-2,2,6,6-tetramethyl-4-hydroxypiperidine) succinate; and C. Performing Coating and Bonding the Film taking a clean transparent supporting layer, uniformly mixing ethyl acrylate, rosin resin and ethylene glycol with a mass ratio of (2.5-3.5):1:(2.5-3.5) at 50° C. to 60° C., and then uniformly coating the upper surface of the transparent supporting layer or the lower surface of the PET film layer in step B with the mixture to form an adhesive layer, and then bonding the PET film layer and the transparent supporting layer together by the adhesive layer, thereby obtaining the PET-film-bonded type transparent anti-UV projection screen.

The product of the present invention has higher transparency and definition, has a more remarkable transparent imaging effect, and can absorb ultraviolet light in the case of light transmission to avoid damage to the human body. The transmittance of visible light of the product can reach 85% to 95%. The absorption rate of the product for ultraviolet rays can reach 78% to 88%. The method of the present invention is simpler in production process and more suitable for mass production, and the output per day of one production line can reach 1000 to 1300 square meters.

BRIEF DESCRIPTION OF THE SEVERAL VIEWS OF THE DRAWINGS

The FIGURE is a structural diagram of the product of the present invention. In the drawings, the parts represented by each reference numbers are listed as follows:
1, transparent supporting layer,
2, adhesive layer, and
3, PET film layer.

DETAILED DESCRIPTION OF THE INVENTION

The principles and features of the present invention are described below, and the examples are intended to explain the present invention only and not to limit the scope of the present invention.

Embodiment 1

As shown in FIG. 1, a PET-film-bonded type transparent anti-UV projection screen comprises a PET film layer 3, an adhesive layer 2 and a transparent supporting layer 1 which are sequentially stacked from top to bottom. The transparent supporting layer 1 is a transparent polycarbonate plate having a thickness of 0.1 mm. The adhesive layer 2 is formed by uniformly stirring ethyl acrylate, rosin resin and ethylene glycol with a mass ratio of 2.5:1:2.5 at 50° C. and then performing uniform coating.

The PET film layer 3 is prepared by uniformly mixing PET resin, an antioxidant, a light stabilizer and a nanoparticle dispersion in a molten state, pre-crystallizing and drying the mixture, and then extruding, stretching and molding the mixture. The nanoparticle dispersion is prepared by uniformly mixing nanoparticles, a dispersant and a solvent, and then dispersing the mixture with ultrasonic waves. The nanoparticles are composed of titanium dioxide nanoparticles and inorganic salt nanoparticles with a mass ratio of 1:9. The titanium dioxide nanoparticles are nanoparticles adopting an anatase crystal structure or a rutile crystal structure and having an average diameter of 20 nm, and the inorganic salt nanoparticles are nanoparticles of barium sulfate having an average diameter of 100 nm. The distribution density of the nanoparticles in the PET film layer 3 is 0.008 g/mm·m2, and the thickness of the PET film layer 3 is 0.05 mm.

A production method for the above PET-film-bonded type transparent anti-UV projection screen comprises the steps of:

A. Preparing a Nanoparticle Dispersion mixing 0.001 g of nanoparticles, 0.001 g of a dispersant, and 16 g of a solvent uniformly, dispersing the mixture by ultrasonic wave with a frequency of 20 KHz for 20 minutes to make the nanoparticles uniformly dispersed in the solvent, and thus obtaining a uniform and stable nanoparticle dispersion, wherein the dispersant is a polyphosphoric acid-based hyperdispersant, and the solvent is methanol;

B. Preparing a PET Film feeding 100 g of PET resin, 0.1 g of an antioxidant, 0.1 g of a light stabilizer and the nanoparticle dispersion prepared in step A into a high speed mixer, stirring and mixing the same in a molten state uniformly, pre-crystallizing and drying the mixture, then feeding the mixture into a screw extruder, and extruding the mixture via a die to obtain a sheet, and then, biaxially stretching the sheet simultaneously to obtain a PET film layer 3 having a nanoparticle distribution density of 0.008 g/mm·m2, wherein the antioxidant is octadecyl β-(3,5-di-tert-butyl-4-hydroxyphenyl)propionate, and the light stabilizer is 2-hydroxy-4-n-octyloxybenzophenone and bis(2,2,6,6-tetramethyl-4-piperidinyl) sebacate; and C. Performing Coating and Bonding the Film:

taking a clean transparent supporting layer 1, uniformly stirring ethyl acrylate, rosin resin and ethylene glycol with a mass ratio of 2.5:1:2.5 at 50° C., and then uniformly coating the upper surface of the transparent supporting layer 1 with the mixture to form an adhesive layer 2, and then bonding the PET film layer 3 and the transparent supporting layer 1 together by the adhesive layer 2, thereby obtaining the PET-film-bonded type transparent anti-UV projection screen. The PET-film-bonded type transparent anti-UV projection screen is simpler in production process, low in cost and high in production efficiency, and thus can be widely used in the fields of indoor advertising, architectural glass, GPS display of vehicle windows and the like.

Embodiment 2

As shown in FIG. 1, a PET-film-bonded type transparent anti-UV projection screen comprises a PET film layer 3, an adhesive layer 2 and a transparent supporting layer 1 which are sequentially stacked from top to bottom. The transparent supporting layer 1 is a transparent glass plate having a thickness of 20 mm. The adhesive layer 2 is formed by uniformly stirring ethyl acrylate, rosin resin and ethylene glycol with a mass ratio of 3.5:1:3.5 at 60° C. and then performing uniform coating.

The PET film layer 3 is prepared by uniformly mixing PET resin, an antioxidant, a light stabilizer and a nanoparticle dispersion in a molten state, pre-crystallizing and drying the mixture, and then extruding, stretching and molding the mixture. The nanoparticle dispersion is prepared by uniformly mixing nanoparticles, a dispersant and a solvent, and then dispersing the mixture with ultrasonic waves. The nanoparticles are composed of titanium dioxide nanoparticles and inorganic salt nanoparticles with a mass ratio of 9:1. The titanium dioxide nanoparticles are nanoparticles adopting an anatase crystal structure and a rutile crystal structure and having an average diameter of 100 nm, and the inorganic salt nanoparticles are nanoparticles of barium carbonate having an average diameter of 300 nm. The distribution density of the nanoparticles in the PET film layer 3 is 0.8 g/mm·m2, and the thickness of the PET film layer 3 is 5 mm.

A production method for the above PET-film-bonded type transparent anti-UV projection screen comprises the steps of:

A. Preparing a Nanoparticle Dispersion mixing 0.1 g of nanoparticles, 0.003 g of a dispersant, and 23 g of a solvent uniformly, dispersing the mixture by ultrasonic wave with a frequency of 1000 KHz for 310 minutes to make the nanoparticles uniformly dispersed in the solvent, and thus obtaining a uniform and stable nanoparticle dispersion, wherein the dispersant is a poly silicic acid-based hyperdispersant, and the solvent is ethanol;

B. Preparing a PET Film feeding 100 g of PET resin, 5 g of an antioxidant, 5 g of a light stabilizer and the nanoparticle dispersion prepared in step A into a high speed mixer and stirring and mixing the same in a molten state uniformly, pre-crystallizing and drying the mixture, then feeding the mixture into a screw extruder, and extruding the mixture via a die to obtain a sheet, and then, biaxially stretching the sheet simultaneously to obtain a PET film layer 3 having a nanoparticle distribution density of 0.8 g/mm·m2; wherein the antioxidant is tris (2,4-di-t-butylphenyl) phosphite, and the light stabilizer is bis(1,2,2,6,6-pentamethyl-4-piperidyl) sebacate and poly (1-hydroxyethyl-2,2,6,6-tetramethyl-4-hydroxypiperidine) succinate; and C. Performing Coating and Bonding the Film taking a clean transparent supporting layer 1, uniformly mixing ethyl acrylate, rosin resin and ethylene glycol with a mass ratio of 3.5:1:3.5 at 60° C., and then uniformly coating the lower surface of the PET film layer 3 in step B with the mixture to form an adhesive layer 2, and then bonding the PET film layer 3 and the transparent supporting layer 1 together by the adhesive layer 2, thereby obtaining the PET-film-bonded type transparent anti-UV projection screen. The PET-film-bonded type transparent anti-UV projection screen is simpler in production process, low in cost and high in production efficiency, and thus can be widely used in the fields of indoor advertising, architectural glass, GPS display of vehicle windows and the like.

Embodiment 3

As shown in FIG. 1, a PET-film-bonded type transparent anti-UV projection screen comprises a PET film layer 3, an adhesive layer 2 and a transparent supporting layer 1 which are sequentially stacked from top to bottom. The transparent supporting layer 1 is a transparent acrylic hardened plate having a thickness of 10 mm. The adhesive layer 2 is formed by uniformly stirring ethyl acrylate, rosin resin and ethylene glycol with a mass ratio of 3:1:3 at 55° C. and then performing uniform coating.

The PET film layer 3 is prepared by uniformly mixing PET resin, an antioxidant, a light stabilizer and a nanoparticle dispersion in a molten state, pre-crystallizing and drying the mixture, and then extruding, stretching and molding the mixture. The nanoparticle dispersion is prepared by uniformly mixing nanoparticles, a dispersant and a solvent, and then dispersing the mixture with ultrasonic waves. The nanoparticles are composed of titanium dioxide nanoparticles and inorganic salt nanoparticles with a mass ratio of 1:1. The titanium dioxide nanoparticles are nanoparticles adopting an anatase crystal structure and a rutile crystal structure and having an average diameter of 60 nm, and the inorganic salt nanoparticles are nanoparticles of barium sulfate, barium carbonate and calcium carbonate having an average diameter of 200 nm. The distribution density of the nanoparticles in the PET film layer 3 is 1.6 g/mm·m2, and the thickness of the PET film layer 3 is 2.75 mm.

A production method for the above PET-film-bonded type transparent anti-UV projection screen comprises the steps of:

A. Preparing a Nanoparticle Dispersion mixing 0.2 g of nanoparticles, 0.004 g of a dispersant, and 30 g of a solvent uniformly, dispersing the mixture by ultrasonic wave with a frequency of 2000 KHz for 600 minutes to make the nanoparticles more uniformly dispersed in the solvent, and thus obtaining a uniform and stable nanoparticle dispersion, wherein the dispersant is a commercially available hyperdispersant 9800, and the solvent is acetone;

B. Preparing a PET Film feeding 100 g of PET resin, 2.5 g of an antioxidant, 2.6 g of a light stabilizer and the nanoparticle dispersion prepared in step A into a high speed mixer, stirring and mixing the same in a molten state uniformly, pre-crystallizing and drying the mixture, then feeding the mixture into a screw extruder, and extruding the mixture via a die to obtain a sheet, and then, biaxially stretching the sheet simultaneously to obtain a PET film layer 3 having a nanoparticle distribution density of 1.6 g/mm·m2, wherein the antioxidant is pentaerythritol tetrakis[β-(3,5-di-tert-butyl-4-hydroxyphenyl) propionate and bi(octadecyl) thiodipropionate, and the light stabilizer is 2-hydroxy-4-n-octyloxybenzophenone, bis(2,2,6,6-tetramethyl-4-piperidinyl) sebacate and bis(1,2,2,6,6-pentamethyl-4-piperidyl) sebacate; and C. Performing Coating and Bonding the Film taking a clean transparent supporting layer 1, uniformly stirring ethyl acrylate, rosin resin and ethylene glycol with a mass ratio of 3:1:3 at 55° C., and then uniformly coating the lower surface of the PET film layer 3 in step B with the mixture to form an adhesive layer 2, and then bonding the PET film layer 3 and the transparent supporting layer 1 together by the adhesive layer 2, thereby obtaining the PET-film-bonded type transparent anti-UV projection screen. The PET-film-bonded type transparent anti-UV projection screen is simpler in production process, low in cost and high in production efficiency, and thus can be widely used in the fields of indoor advertising, architectural glass, GPS display of vehicle windows and the like.

It is obvious to those skilled in the art that the present invention is not limited to the details of the above exemplary embodiments, and the present invention can be embodied in other specific forms without departing from the spirit or essential features of the present invention. Therefore in anyway, the present embodiments are to be considered as illustrative and not restrictive, and the scope of the present invention is defined by the appended claims not the above description. All changes falling in the meaning and scope of equivalent elements of the claims are intended to be included in the present invention.

The above description is only the preferred embodiments of the present invention, and is not intended to limit the present invention. Any modifications, equivalent replacements, improvements, etc. made within the spirit and scope of the present invention should be included in the protection of the present invention.

I claim:

1. A polyethylene terephthalate-file-bonded type transparent anti-UV projection screen, comprising:
    a polyethylene terephthalate film layer,
    an adhesive layer, and
    a transparent supporting layer,
    wherein said polyethylene terephthalate film layer, said adhesive layer, said transparent supporting layer are sequentially stacked from top to bottom,
    wherein said polyethylene terephthalate film layer is prepared by uniformly mixing polyethylene terephthalate resin, an antioxidant, a light stabilizer and a nanoparticle dispersion in a molten state, pre-crystallizing and drying the mixture, and then extruding, stretching and molding the mixture, the nanoparticle dispersion is prepared by uniformly mixing nanoparticles, a dispersant and a solvent, and then dispersing the mixture with ultrasonic waves, and the distribution density of the nanoparticles in said polyethylene terephthalate film layer is 0.008 to 1.6 g/mm·m2, and
    wherein the nanoparticles are comprised of titanium dioxide nanoparticles and inorganic salt nanoparticles with a mass ratio of (1-81):9, and the titanium dioxide nanoparticles have a diameter of 20 to 100 nm, and the inorganic salt nanoparticles have a diameter of 100 to 300 nm.

2. The projection screen according to claim 1, wherein the titanium dioxide nanoparticles are of an anatase crystal structure and/or a rutile crystal structure, and the inorganic salt nanoparticles are one or more of nanoparticles of barium sulfate, barium carbonate and calcium carbonate.

3. The projection screen according to claim 1, wherein said transparent supporting layer is comprised of a transparent glass plate, a transparent acrylic hardened plate or a transparent polycarbonate plate, and wherein said adhesive layer is formed by uniformly stirring ethyl acrylate, rosin resin and ethylene glycol with the mass ratio of (2.5-3.5) : 1 : (2.5-3.5) at 50° C. -60° C. and then performing uniform coating.

4. The projection screen according to claim 1, wherein said transparent supporting layer has a thickness of 0.1 to 20 mm, and wherein said polyethylene terephthalate film layer has a thickness of 0.05 to 5 mm.

* * * * *